United States Patent
Brown et al.

(10) Patent No.: US 6,718,346 B1
(45) Date of Patent: Apr. 6, 2004

(54) GENERATING SUMMARY DATA FOR A REQUESTED TIME PERIOD HAVING A REQUESTED START TIME AND END TIME A PLURALITY OF DATA RECORDS

(75) Inventors: Ronald Brown, Dunfermline (GB); Jonathan G G Tams, Edinburgh (GB); Peter I Oliver, Falkirk (GB); Iain Hogg, Edinburgh (GB)

(73) Assignee: 3Com Corporation, Santa Clara, CA (US)

( * ) Notice: Subject to any disclaimer, the term of this patent is extended or adjusted under 35 U.S.C. 154(b) by 506 days.

(21) Appl. No.: 09/641,084

(22) Filed: Aug. 17, 2000

(51) Int. Cl.[7] .............................................. G06F 17/30
(52) U.S. Cl. ............................... 707/200; 707/1; 707/3; 707/10; 707/202; 707/205; 709/223; 709/225; 709/250; 713/200; 714/4
(58) Field of Search ...................... 707/1–10, 100–104.1, 707/200–205; 370/252–253, 420, 467; 340/905, 990, 995.13; 379/32.01, 112.01, 112.07, 133; 345/440; 713/200–202; 701/117–202; 709/203–225, 230–242, 250; 714/4–6

(56) References Cited

U.S. PATENT DOCUMENTS

| | | | | |
|---|---|---|---|---|
| 5,615,323 A | * | 3/1997 | Engel et al. ................. | 345/440 |
| 5,867,483 A | * | 2/1999 | Ennis et al. ................. | 370/252 |
| 6,009,530 A | * | 12/1999 | Goatly ........................ | 713/400 |
| 6,134,584 A | * | 10/2000 | Chang et al. ............... | 709/219 |
| 6,205,451 B1 | * | 3/2001 | Norcott et al. .............. | 707/204 |
| 6,249,789 B1 | * | 6/2001 | Delia et al. .................. | 707/102 |
| 6,253,146 B1 | * | 6/2001 | Hanson et al. .............. | 701/202 |
| 6,351,453 B1 | * | 2/2002 | Nolting et al. .............. | 370/234 |
| 6,385,301 B1 | * | 5/2002 | Nolting et al. ........... | 379/32.01 |
| 6,516,348 B1 | * | 2/2003 | MacFarlane et al. ........ | 709/224 |
| 6,519,639 B1 | * | 2/2003 | Glasser et al. .............. | 709/224 |
| 6,553,419 B1 | * | 4/2003 | Ram ........................... | 709/224 |

FOREIGN PATENT DOCUMENTS

| | | | | |
|---|---|---|---|---|
| EP | | 0841772 A2 | * | 5/1998 |
| GB | | 2 352 942 | | 2/2001 |
| WO | WO 00/031963 A1 | | * | 6/2000 ..................... 1/413 |

OTHER PUBLICATIONS

Somayajulu G. Sripada et al., Generating english summaries of time series data using the Gricean Maxims, SIGKDD 2003, Aug. 24–27 Washington, DC, 1–10.*

* cited by examiner

*Primary Examiner*—Srirama Channavajjala
(74) *Attorney, Agent, or Firm*—Michaelson & Associates; Peter L. Michaelson (57) ABSTRACT

Apparatus and method for use in a network of, for example, computers, for generating summary data, such as traffic summary information, from a plurality of data records, the data records having a different temporal basis, for example, one hour or one day or one week, and different start and end times. The summary data is generated for a requested time interval having a requested start time and a requested end time by selecting a data record with a record start time corresponding to the requested start and an end time as far as possible from the record start time but equal to or before the requested end time. The data from that selected data record is processed, and the initial time is then set to the end time of that particular data record and the process repeated. In this way one can gather and process such data with a minimum number of steps.

29 Claims, 4 Drawing Sheets

GENERATING SUMMARY DATA FOR A REQUESTED TIME PERIOD HAVING A REQUESTED START TIME AND END TIME A PLURALITY OF DATA RECORDS

BACKGROUND OF THE INVENTION

The present invention relates to generating summary data such as traffic summary information from a plurality of records. A preferred arrangement includes obtaining event information such as traffic summary information for a requested period of time from multiple tables of differing temporal resolutions. Whilst the invention is applicable to handling of different types of information in multiple tables, we will describe as a preferred arrangement a method of obtaining traffic summary information for a requested period of time from multiple database tables of differing temporal resolutions, the traffic information being in respect of the traffic carried by a computer network.

The monitoring of computer or communications network usage is very important in modern computer networks, including local area networks (LANs) and wide area networks (WANs) as it allows the network manager to see how the network is performing. This allows the network manager to perform traffic flow analysis, determine bandwidth requirements, enforce company policies and ensure that the security of the network has not been compromised. However, it will be understood that the invention may be applied to other systems, for example, where the information relates to road traffic, or a telephone network traffic, or a railway system, or an electrical supply network (for example, where the relevant information may be the power or current).

Network monitoring applications often collect information on some or all of the individual traffic flows between network elements. This information may then be stored in a plurality of tables usually on databases held on computers connected to the network, which computers are accessible to the network manager. The information may be analysed at a later date.

A common technique used to control the amount of storage space required for the database table is to accumulate into a single record all data covering a known time interval (the record time interval) having a known record start time, a known record end time, and a known record period, although only two of these three are required as the third can thereby be deduced: for example, a single database table record may represent all data on a given traffic flow for a known record period which may comprise one hour or one day (a database table storing daily data having a lower temporal resolution than a database table storing hourly data).

Thus different temporal resolutions of data may be stored and updated in different database tables; for example, one table of records may hold data in a format where each record contains the sum of a defined hour of data on a particular traffic flow while another table of records holds data in a format where each record contains the sum of a defined day of data on a particular traffic flow. Each temporal resolution table may store different numbers of records, for example, an hourly resolution table may only store one week's worth of data at high resolution, whilst a daily resolution table may store one month's worth of data at lower resolution.

Thus in a first table traffic data in respect of a number of links in a computer network may be stored in successive records for successive record periods of one hour, for example, 12 am to 1 am; 1 am to 2 am; 2 am to 3 am; etc, and in another table, for successive record periods of one day, for example; start (12 am) day 1 to end day 1; start day 2 to end day 2; start day 3 to end day 3 etc.

From time to time, it is desirable to provide traffic information in respect of a requested period of time, defined by a requested start time and a requested end time, which spans a number of record periods.

A particular problem arises in that it is desirable to reduce the amount of calculations required to provide the traffic information for the requested period. It is therefore desirable to use as the basis of traffic summary information for the requested period, a database table having the minimum temporal resolution since that will require the minimum computation. However, problems arise in that it may be required to provide traffic information in respect of a requested period of time that does not match the record periods of time of the database table with the minimum temporal resolution. For example, it may be desired to determine the traffic data in respect of a requested period of time, starting, for example, 1 pm on a day 1 and ending 1 pm on day 3. Hitherto, in order to provide that information, one could not use a daily table but one would have to use an hourly table, which means that 48 separate records would have to be processed whereas if the requested start and end times had been a 48 hour period starting start day 1 and ending end day 2 then two daily records only would need to be retrieved and processed.

SUMMARY OF THE INVENTION

The present invention relates to a method of reducing or minimising this problem We will describe a method and an algorithm that, given a requested time interval, will generate summary data (total amount of data over the requested time interval) for e.g. requested traffic flows by combining data from different records from, for example, different database tables of differing temporal resolutions and time periods (as described above).

The present invention provides a method of generating summary data for a requested time period having a requested start time and a requested end time from a plurality of data records, each data record comprising a summary of the relevant data between a record start time and a record end time, said method comprising;

(a) setting a current start time equal to the requested start time;

(b) selecting a record with a start time equal to the current start time and an end time furthest from the start time but before or equal to the requested end time;

(c) processing the data from this record;

(d) setting the current start time equal to the record end time of that record;

(e) if the current start time is earlier than the requested end time, repeating steps (b) to (e) and if the current start time is not earlier than the requested end time, finishing.

In this way, the data to be processed is reduced. The processing may comprise summing of the data.

Where there is more than one type of data, the step (b) includes selecting a record with the relevant data. In one arrangement, the relevant data is traffic information, for example the information relating to traffic on a computer or communications network.

The data may be stored in a plurality of tables, and commonly each table stores data of different temporal resolution, that is, each record in a particular table will store data for a period of time of the same length and the relevant period will be different for different tables. Thus each record in one table may include data in respect of one hour and each record in another table may include data in respect of one day.

According to another aspect, the present invention provides a method of generating summary information over a requested time period having a requested start time and a requested end time by combining data from a plurality of tables of different temporal resolutions, said method comprising;

(a) determining the requested type of data, requested start time, and requested end time for the requested summary information;

(b) setting a current start time equal to the requested start time;

(c) selecting an appropriate temporal resolution table based on current start time and requested end time;

(d) processing data records from the selected table;

(e) setting the current start time equal to the end time of selected time interval;

(f) if the current start time is earlier than the requested end time, repeating steps (c) to (f) and if the current start time is not earlier than the requested end time, finishing.

Preferably, in step (c) the appropriate table is the table with the minimum temporal resolution which includes a record having a record start time corresponding to the current start time.

Preferably in step (d), the processing includes summing the data from the relevant records.

Preferably, step (c) comprises;

selecting the table with the lowest temporal resolution:
  determining if the table contains a record start time corresponding to the current start time and the record end time is earlier than or equal to the requested end time;
  if the table does include such a record, selecting that table;
  if the table does not include such a record, determining if there any more tables with higher temporal resolution;
  if there are such tables, selecting the table with the next highest temporal resolution and returning to the first determining step;
  if there are no such tables, selecting the table which has the most amount of overlap with the current start time and requested end time.

Preferably step (d) comprises;

selecting the relevant data from the selected record;

determining if the selected record time interval lies completely between current start time and request end time,
  if it does so, adding all of the selected data from that record to the summary for that relevant data;
  if in the first determining step the selected record time interval does not lie completely between current start time and request end time, adding pro-rata the part of the data for that record which overlaps with the current start time and requested end time to the summary for that data.

According to another aspect, the present invention also provides a computer program on a computer readable medium or embodied in a carrier wave for generating summary data for a requested time period having a requested start time and a requested end time from a plurality of data records, each data record comprising a summary of the relevant data between a record start time and a record end time, said computer program comprising:

(a) a program step for setting a current start time equal to the requested start time;

(b) a program step for selecting a record with a start time equal to the current start time and an end time furthest from the start time but before or equal to the requested end time;

(c) a program step for processing the data from this record;

(d) a program step for setting the current start time equal to the record end time of that record;

(e) a program step for repeating steps (b) to (e) if the current start time is earlier than the requested end time, and, finishing if the current start time is not earlier than the requested end time.

According to another aspect, the present invention also provides a computer program on a computer readable medium or embodied in a carrier wave for generating summary information over a requested time period having a requested start time and a requested end time by combining data from a plurality of tables of different temporal resolutions, said program comprising;

(a) a program step for determining the requested type of data, requested start time, and requested end time for the requested summary information;

(b) a program step for setting a current start time equal to the requested start time;

(c) a program step for selecting an appropriate temporal resolution table based on current start time and requested end time;

(d) a program step for processing data records from the selected table;

(e) a program step for setting the current start time equal to the end time of selected time interval;

(f) a program step for repeating steps (c) to (f) if the current start time is earlier than the requested end time and finishing if the current start time is not earlier than the requested end time.

The speed of data retrieval is reduced by minimising the number of database table records that have to be retrieved and processed. For example, if a single days worth of data on a given traffic flow is represented by both a single daily record and twenty-four hourly records, the daily record will be retrieved in preference (assuming that the entire day is spanned by the requested time interval).

Additionally, if the requested start time and end time do not map exactly to the start time and end time of record time intervals available in the various temporal tables the algorithm will aim for the best accuracy by choosing the temporal resolution and time interval that has the best overlap at that boundary. The use of pro-rata calculations are avoided where possible as these may lead to a reduction of accuracy of the results.

We will describe a method of generating traffic summary information for a requested period by combining data from multiple database tables of differing temporal resolutions. It allows traffic summaries to be generated for requested time intervals that span the data available in multiple tables and describes a method of reducing the number of records that have to be processed.

BRIEF DESCRIPTION OF THE DRAWINGS

A preferred embodiment will now be described by way of example only and with reference to the accompanying drawings in which FIGS. 1, 2 and 3 in combination show an algorithm for carrying out a method of the invention.

DESCRIPTION OF THE PREFERRED EMBODIMENTS

We will now describe a preferred embodiment of the invention which provides a method whereby a network manager may more efficiently understand how a network is performing.

Figure 4:
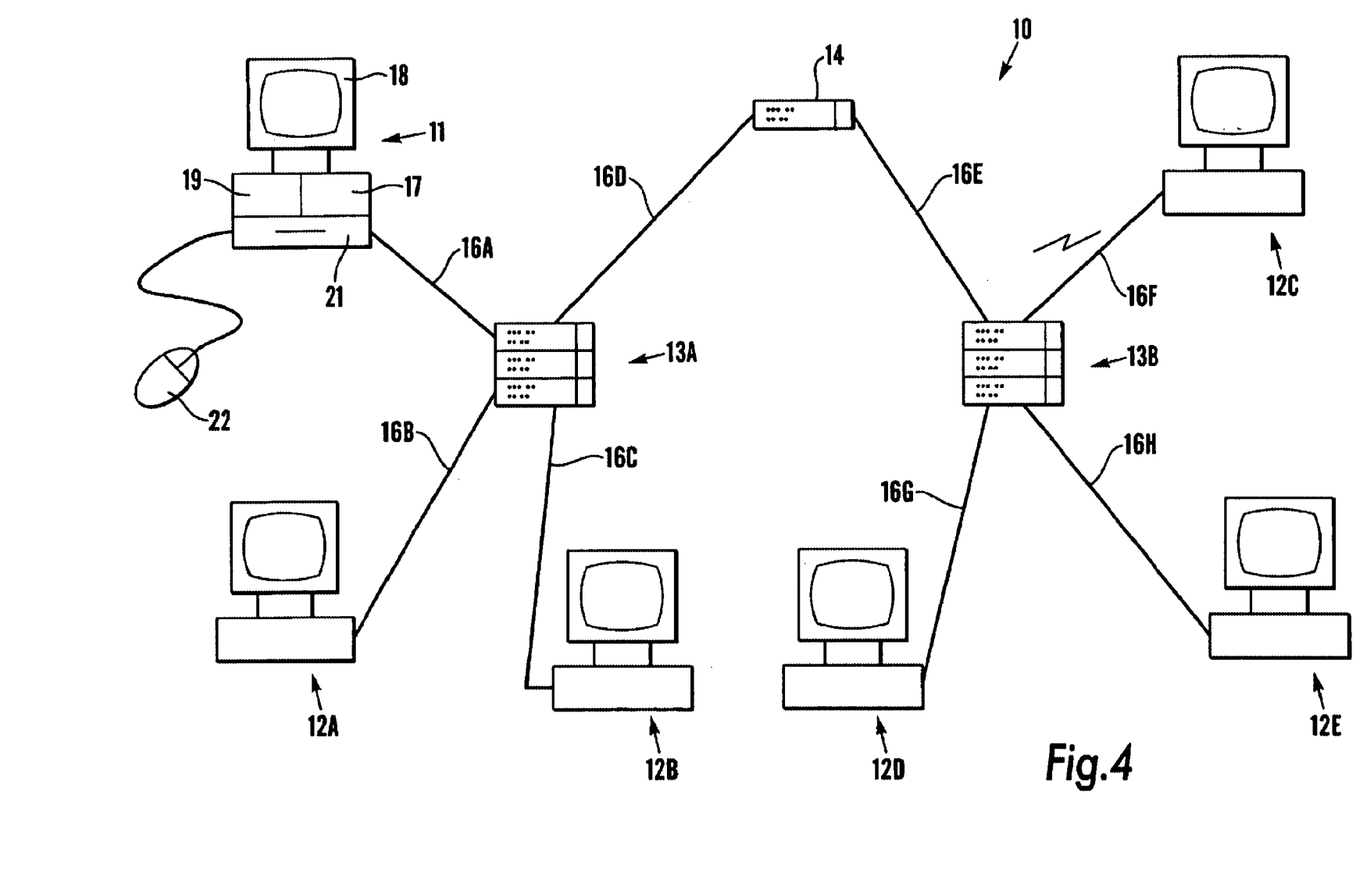
FIG. 4 is a diagram of a computer network.

The method may be applied to a network which comprises, for example, a computer network of the type shown in FIG. 4 which is a schematic. In practice, a network is normally more complex than that illustrated in FIG. 4. The network includes computers, workstations 12A–E, hubs 13A, 13B, routers, switches 14, printers and other devices linked together by physical cable 16A–H or wireless links 16F. The network may be a local area network (LAN), or a wide area network (WAN) or other types and may operate in accordance with any desired protocol. The network will be managed by a network manager who will normally have a dedicated work station or computer 11 which comprises, in addition to a graphical user interface 18, a central processing unit or signal processor 19, a selector which may be in the form of a mouse 22 and/or keyboard to operate the computer, and, may include a CD drive 21, a floppy disk drive or a zip drive. There will also be provided a dedicated memory 17 for storing traffic information in the form of a database which may be managed in accordance with a program provided to the network manager's computer by means, for example, of a CD, a floppy disk, or a zip disk loaded at the network manager's computer. Traffic data will be retrieved from software in, for example, switches that trap information as traffic flows therethrough and stores the information in its MIBs. The data is retrieved by RMON2 probes provided in the network (RMON2—Remote Network Monitoring described in IETF RFC2021).

Before describing the algorithms shown in the drawings, we will describe the preferred method of the invention in general terms.

Let us assume that there are two tables, which provide successive records for successive different periods of time, each record including the relevant sums of traffic information for the relevant period of data.

Thus in the first table, a first record comprises a record of the sum of the data for an hour extending from 12 am to 1 am of day 1, a second record from 1 am to 2 am of day 1, a third record from 2 am to 3 am of day 1, etc. The table may store, for example, hourly records for a total of one week.

The second table stores similar sums of traffic data on a daily basis. For example, the first record will record the sum of traffic data from the start of day 1 to the end of day 1, the second record from the start of day 2 to the end of day 2, the third record from the start of day 3 to the end of day 3, etc. The table may store as a historical database, for example, table records for one month.

Clearly if an operator requests the sum of all of the traffic data for a requested period of time, then if that requested period of time coincides with several days, for example, start day 1 to end of day 2, then the second table will provide the information by simply adding the two daily records. If the user requests traffic information for a short period of time, between 1 pm and 4 pm on day 2, then the first table will provide the necessary information by summing three successive records.

On the other hand, if the user requests a sum of the traffic information between, say, 1 pm on day 1 and 9 am on day 3, then hitherto it has been necessary to utilise the first table since that is the only table which has records of traffic information on hourly resolutions. This will require, therefore, the addition of data from forty-four separate records.

The present invention seeks to reduce this.

Figure 1:
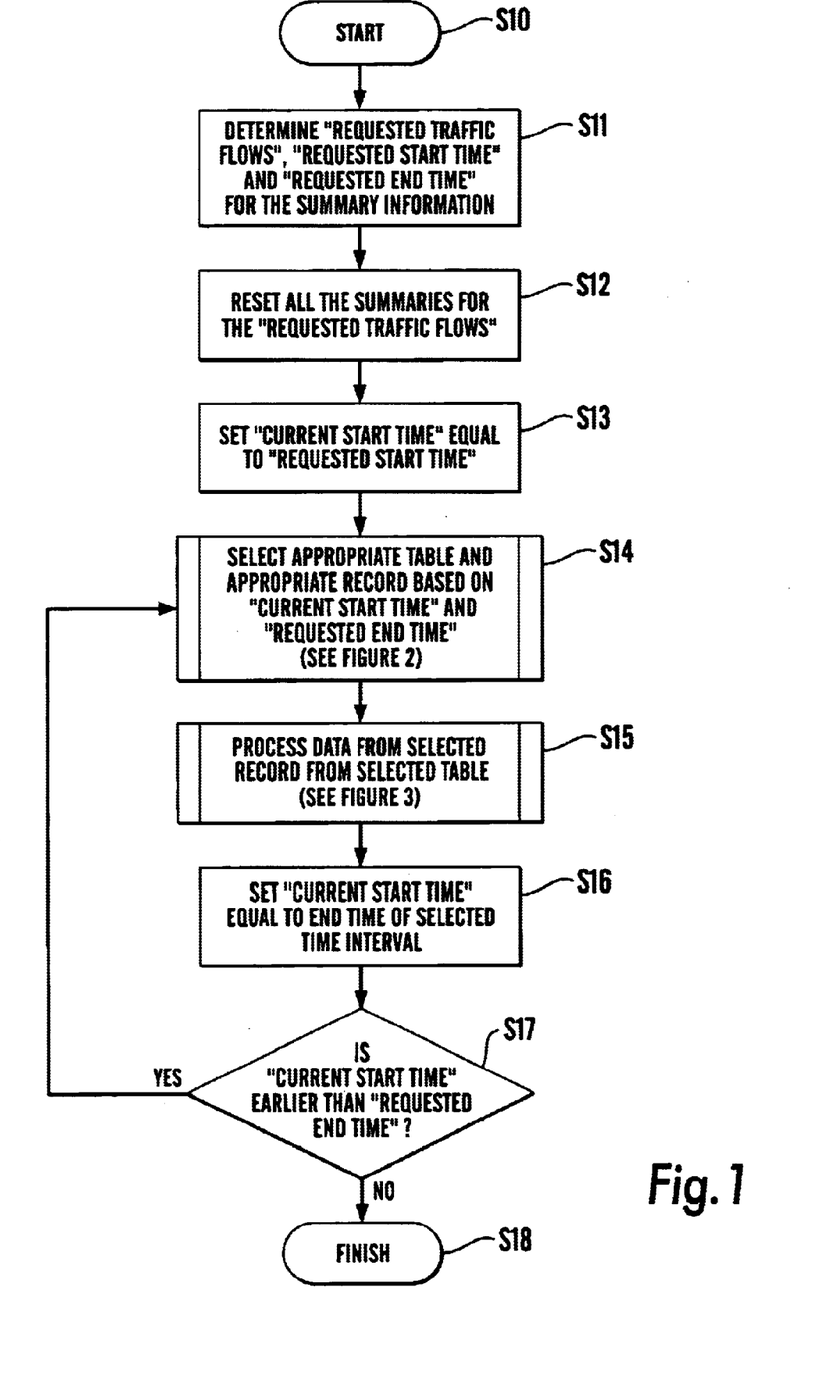

Thus in carrying out the method of the invention, the algorithm starts at the relevant 1 pm on day 1 and determines the tables which include relevant records having record start times of 1 pm on day 1, (program step S13; note the steps will be described in greater detail below), and from those tables selects the table which has the minimum resolution, i.e. each record has data for the maximum period of time (step S14). Only the hourly table includes a record start time of 1 pm day 1 and so the method starts by retrieving the first hourly record, 1 pm to 2 pm day 1, from the hourly table and processing that record (step S15).

The process is repeated for 2 pm. The start time is set at the relevant 2 pm (step S16) and if the current start time is earlier than the requested end time (program step S17) the method then seeks similarly the table which includes a record start time of the relevant 2 pm (step S13) and which has the minimum resolution (step S14) and once again this is the second hourly table. It retrieves this second record. This process is repeated at 3 pm etc.

However, when it comes to midnight on day 1, the table with the minimum resolution, which has a record start time of midnight is the daily table and so the method then retrieves the relevant record for day 2 from the daily table. (Assuming that the requested end point is equal to or beyond the end point time of the relevant record in the daily table, which in this case it is.)

The process will then be repeated for the next record start time i.e. the start of day 3, but in this case the relevant period of time of the record extends beyond the end of the requested time and so the method switches to a higher resolution table, in this case the hourly table and repeatedly retrieves the hourly records from the start of day 3 until the requested end time (9 am) is reached.

Using this method the number of records to be retrieved and processed reduces from forty-four to twenty.

Figure 2:
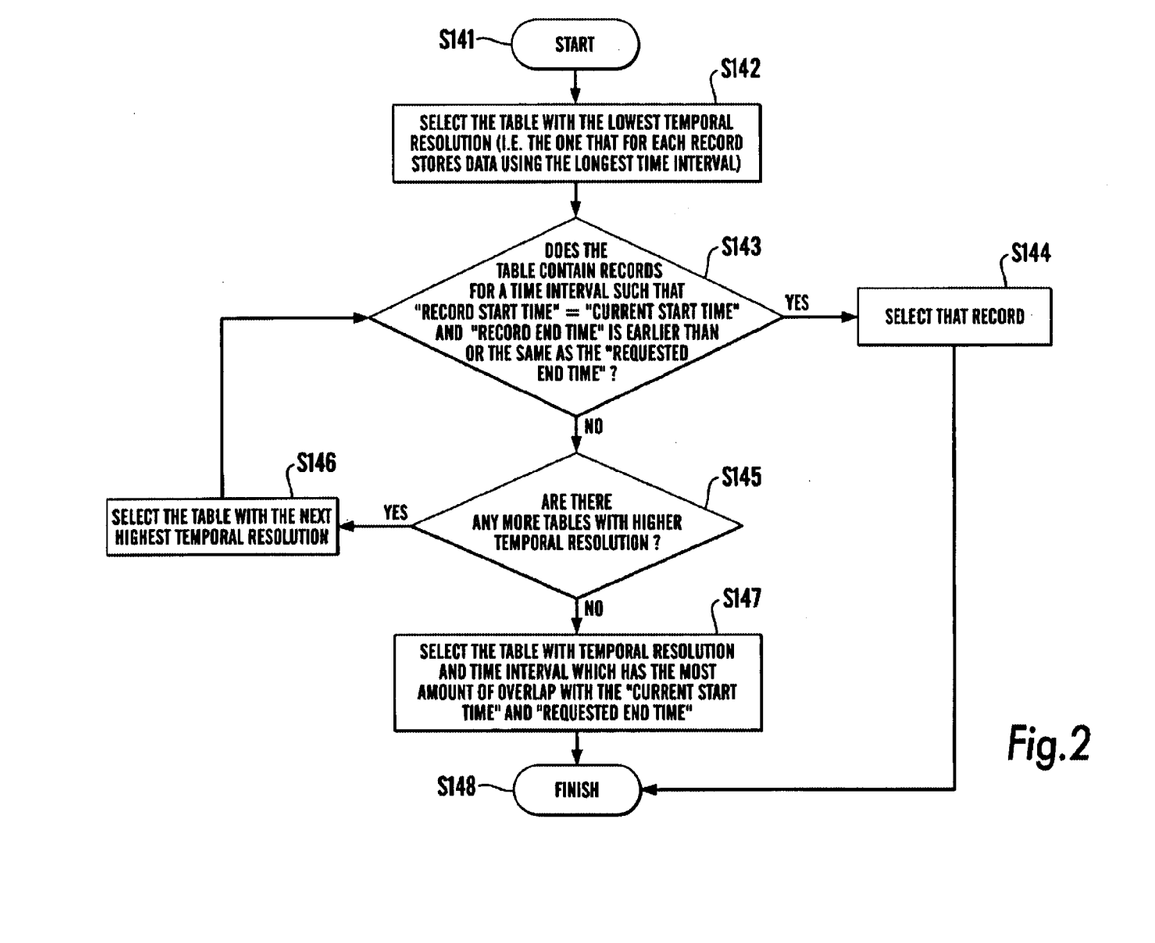
Figure 3:
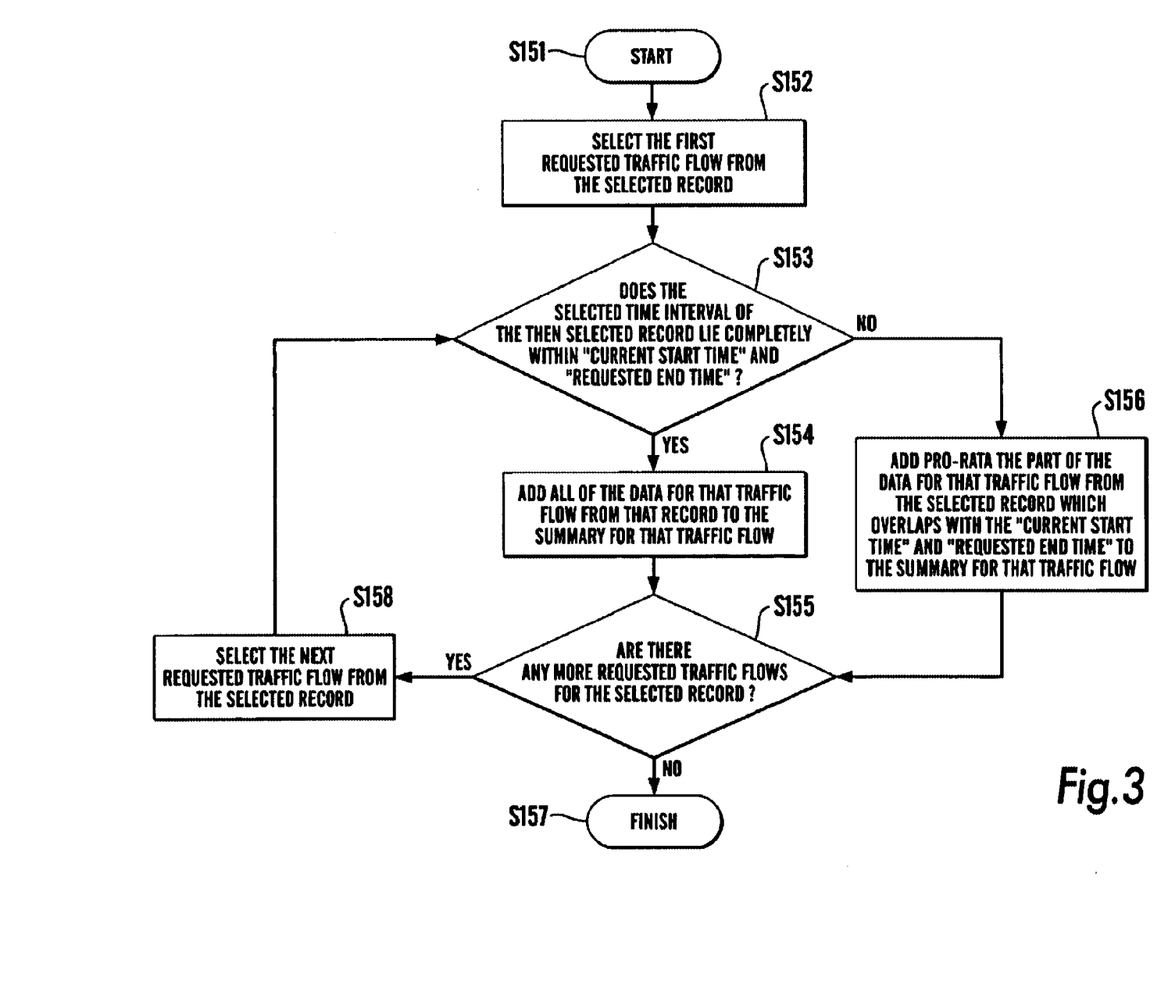

In the example chosen above the requested start time and the requested end time coincide with times, which are available from the relevant tables. However, there may be circumstances in which the requested start time is, for example, 1.15 pm on day 1 (rather than 1 pm) and the requested end time is 9.15 am on day 3 (rather than 9 am). This is dealt with in steps 147 and 156 by arranging to select the record with the time interval or period, which has the most amount of overlap with the relevant period, and then adding pro-rata part of the data for that time interval. Thus in the case given herein, the algorithm would set the start time at 1 pm on day 1 and include three-quarters (i.e. 45 minutes/1 hour) or the data for the time interval record 1 pm–2 pm of day 1. Similarly, in respect of the requested end time, the algorithm would select the time interval 1 pm–2 pm day 3 and add one quarter (15 minutes/1 hour) of the traffic data from that time interval record.

Clearly, other ways of estimating may be carried out.

The program may include an algorithm of the form set out in FIGS. 1–3. Thus the program may include the following steps:

program step S10—start;

program step S11—determine requested traffic flow, requested start time, and requested end time for the summary information;

program step S12—reset all of the summaries for the requested traffic flows;
program step S13—set current start time equal to requested start time;
program step S14—(set out in more detail in FIG. 2) select appropriate table and appropriate record based on current start time and requested end time;
program step S15—(illustrated in greater details in FIG. 3) process data from selected record from selected table;
program step S16—set current start time equal to record end time of that record;
program step S17—is the current start time earlier than requested end time?
if yes, return to program step S14;
if no, go to program step S18—finish.

We now set out the steps of program step S14 in more detail with reference to FIG. 2.
program step S141—start;
program step S142—select the table with the lowest temporal resolution (i.e. the one that for each record stores data using the longest time interval);
program step S143—does the table contain records for a time interval such that the interval start time is equal to the current start time and the interval end time is earlier than or the same as the requested end time?
if yes, go to step S144;
if no, go to step S145;
program step S144—select that record, and go to program step S148—finish.
program step S145—are there any more tables with higher temporal resolution?
if yes, go to step S146,
if no, go to step S147;
program step S146—select the table with the next highest temporal resolution and return to program step S143;
program step S147—select the table with temporal resolution and time interval, which has the most amount of overlap with the current start time and requested end time and to go program step S148—finish.
From program step S148, go to program step S15 (FIG. 1).

We now set out in more detail the program step S15 with respect to FIG. 3.
program step S151—start;
program step S152—select the first requested traffic flow from the selected record;
program step S153—does the time interval of the selected record lie completely within current start time and request end time?
if yes, go to program step S154,
if no, go to program step S156;
program step S154, add all of the data for that traffic flow from that record to the summary for that traffic flow;
program step S155, are the any more requested traffic flows for the selected record?
if yes, go to program step S158;
if no, go to program step S157, finish.
program step S156—add pro-rata the part of the data for that traffic flow from the selected record which overlaps with the current start time and requested end time to the summary for that traffic flow, and go to program step S155;
program step S158—select the next requested traffic flow from the selected record and go to program step S153;
at program step S157, go to program step S16.

The preferred method of the invention is carried out under the control of a network manager's work station or computer and in particular by means of a program controlling the process of that computer or elsewhere in the system.

The program for controlling the operation of the invention may be provided on a computer readable medium, such as a CD, or a floppy disk, or a zip drive disk carrying the program or its equivalent, or may be provided on a computer or computer memory carrying the website of, for example, the supplier of the network products. The program may be downloaded from which ever appropriate source and used to control the processor to carry out the steps of the invention as described.

What is claimed is:

1. A method of generating summary data for a requested time period having a requested start time and a requested end time from a plurality of data records, said method comprising:

(a) providing a plurality of data records, each said data record comprising a summary of the relevant data between a record start time and a record end time, said data records having different record start times, different record end times and record time periods of different lengths;

(b) setting a current start time equal to said requested start time;

(c) selecting the one of said data records with a record start time equal to the current start time and a record end time furthest from said record start time but before or equal to said requested end time;

(d) processing the data from said selected one of said data records;

(e) setting a new current start time equal to said end time of said selected one of said data records; and (f) if said new current start time is earlier than said requested end time, repeating steps (c) to (f) and if said new current start time is not earlier than said requested end time, processing the processed data provided in successive steps (d) to provide said summary data for said requested time period having said requested start time and said requested end time.

2. A method of generating summary data as claimed in claim 1 in which said data records are stored in a plurality of tables, each of said tables storing data records of a respective time period so that the different tables store data of different temporal resolutions.

3. A method of generating summary data as claimed in claim 2 in which, step (c) comprises;

selecting the table with the lowest temporal resolution;
determining if the table contains a data record with a record start time corresponding to the current start time and a record end time earlier than or equal to the requested end time;
if the table does include such a data record, selecting that table;
if the table does not include such a data record, determining if there any more tables with a higher temporal resolution;
if there are such tables, selecting the table with the next highest temporal resolution and returning to the first determining step; and
if there are no such tables, selecting the table that has the most amount of overlap with the current start time and requested end time.

4. A method of generating summary data as claimed in claim 2 in which step (d) comprises;

selecting the relevant data from the selected record;
determining if the selected record time interval lies completely between current start time and request end time;

if it does so, adding all of the selected data from that record to the summary for that relevant data; and if in the first determining step the selected record time interval does not lie completely between current start time and request end time, adding pro-rata the part of the data for that record which overlaps with the current start time and requested end time to the summary for that data.

5. A method of generating summary data as claimed in claim 1 in which said processing the data from said selected one of said data records comprises summing the data from said selected one of said data records.

6. A method of generating summary data as claimed in claim 1 in which there is more than one type of data, and the step (c) includes selecting a record with the relevant data.

7. A method of generating summary data as claimed in claim 6 in which step (d) comprises;

selecting the relevant data from the selected record;

determining if the selected record time interval lies completely between current start time and request end time;

if it does so, adding all of the selected data from that record to the summary for that relevant data;

if in the first determining step the selected record time interval does not lie completely between current start time and request end time, adding pro-rata the part of the data for that record which overlaps with the current start time and requested end time to the summary for that data; and including, after said step for determining if the selected record time interval lies completely between current start time and request end time, determining if there are any more types of data required and, if so, selecting the next requested type of data from the selected record and returning to the first determining step above, and, if not, returning to the preceding step.

8. A method of generating summary data as claimed in claim 1 in which the relevant data is traffic information relating to traffic on a computer or communications network.

9. A computer program on a computer readable medium loadable into a digital computer or embodied in a carrier wave, said computer program comprising software for performing the method of claim 1.

10. A method of generating summary information over a requested time period having a requested start time and a requested end time by combining data from a plurality of tables of different temporal resolutions, said method comprising;

(a) determining the requested type of data, requested start time, and requested end time for the requested summary information;

(b) setting a current start time equal to the requested start time;

(c) selecting an appropriate temporal resolution table based on current start time and requested end time;

(d) processing data records from the selected table;

(e) setting the current start time equal to the end time of selected time interval;

(f) if the current start time is earlier than the requested end time, repeating steps (c) to (f) and if the current start time is not earlier than the requested end time, finishing.

11. A method of generating summary information as claimed in claim 10 in which the processing includes summing the data from the relevant records.

12. A method of generating summary information as claimed in claim 10 in which step (c) comprises;

selecting the table with the lowest temporal resolution:

determining if the table contains a record start time corresponding to the current start time and the record end time is earlier than or equal to the requested end time;

if the table does include such a record, selecting that table;

if the table does not include such a record, determining if there any more tables with higher temporal resolution;

if there are such tables, selecting the table with the next highest temporal resolution and returning to the first determining step;

if there are no such tables, selecting the table which has the most amount of overlap with the current start time and requested end time.

13. A method of generating summary information as claimed in claim 10 in which step (d) comprises;

selecting the relevant data from the selected record;

determining if the selected record time interval lies completely between current start time and request end time, if it does so, adding all of the selected data from that record to the summary for that relevant data;

determining if there are any more types of data required and if so, selecting the next requested type of data from the selected record and return to the first determining step above, and if not returning to the preceding step;

if in the first determining step the selected record time interval does not lie completely between current start time and request end time, adding pro-rata the part of the data for that record which overlaps with the current start time and requested end time to the summary for that data, and returning to the second determining step.

14. A method of generating summary information as claimed in claim 10 in which, if the requested start time and end time do not map exactly to the start time and end time of record time intervals available in the various temporal tables, choosing the temporal resolution and time interval that has the best overlap at that boundary.

15. A method of generating summary information as claimed in claim 10 in which, in step (c) the appropriate table is the table with the minimum temporal resolution which includes a record having a record start time corresponding to the current start time.

16. A computer program on a computer readable medium or embodied in a carrier wave for generating summary data for a requested time period having a requested start time and a requested end time from a plurality of data records, each data record comprising a summary of the relevant data between a record start time and a record end time, the data records having different record start times and different record end times and record time periods of different lengths, said computer program comprising:

(a) a program step for setting a current start time equal to the requested start time;

(b) a program step for selecting a data record with a record start time equal to the current start time and a record end time furthest from the record start time but before or equal to the requested end time;

(c) a program step for processing the data from this data record;

(d) a program step for setting the current start time equal to the record end time of that first selected data record; and (e) a program step for repeating steps (b) to (e) if the current start time is earlier than the requested end time, and, if the current start time is not earlier than the requested end time, processing the processed data provided in successive steps (d) to provide said summary data for said requested time period having said requested start time and said requested end time.

17. A program as claimed in claim 16 in which the records are stored in a plurality of tables, each of said tables storing data records of a respective time period so that the different tables store data of different temporal resolutions.

18. A program as claimed in claim 17 in which, step b) comprises;
- a program step for selecting the table with the lowest temporal resolution;
- a program step for determining if the table contains a record start time corresponding to the current start time and the record end time is earlier than or equal to the requested end time;
- a program step for selecting that table if the table does include such a record;
- a program step for determining if there any more tables with higher temporal resolution if the table does not include such a record;
- a program step for selecting the table with the next highest temporal resolution and returning to the first determining step if there are such tables;
- a program step for selecting the table which has the most amount of overlap with the current start time and requested end time if there are no such tables.

19. A program as claimed in claim 17 in which step (c) comprises;
- a program step for selecting the relevant data from the selected record;
- a program step for determining if the selected record time interval lies completely between current start time and request end time,
- a program step for adding all of the selected data from that record to the summary for that relevant data if it does so;
- a program step for adding pro-rata the part of the data for that record which overlaps with the current start time and requested end time to the summary for that data if in the first determining step the selected record time interval does not lie completely between current start time and request end time.

20. A program as claimed in claim 16 in which the processing comprises summing the data.

21. A program as claimed in claim 16 in which there is more than one type of data, and the program step (b) includes selecting a record with the relevant data.

22. A program as claimed in claim 21 in which step (c) comprises;
- a program step for selecting the relevant data from the selected record;
- a program step for determining if the selected record time interval lies completely between current start time and request end time,
- a program step for adding all of the selected data from that record to the summary for that relevant data if it does so;
- a program step for adding pro-rata the part of the data for that record which overlaps with the current start time and requested end time to the summary for that data if in the first determining step the selected record time interval does not lie completely between current start time and request end time,
- a program step for including, after said step for determining if the selected record time interval lies completely between current start time and request end time, determining if there are any more types of data required and, if so, selecting the next requested type of data from the selected record and returning to the first determining step above, and, if not, returning to the preceding step.

23. A program as claimed in claim 16 in which the relevant data is traffic information relating to traffic on a computer or communications network.

24. A computer program on a computer readable medium or embodied in a carrier wave for generating summary information over a requested time period having a requested start time and a requested end time by combining data from a plurality of tables of different temporal resolutions, said program comprising;
- (a) a program step for determining the requested type of data, requested start time, and requested end time for the requested summary information;
- (b) a program step for setting a current start time equal to the requested start time;
- (c) a program step for selecting an appropriate temporal resolution table based on current start time and requested end time;
- (d) a program step for processing data records from the selected table;
- (e) a program step for setting the current start time equal to the end time of selected time interval;
- (f) a program step for repeating steps (c) to (f) if the current start time is earlier than the requested end time and finishing if the current start time is not earlier than the requested end time.

25. A program as claimed in claim 24 in which, in step (c) the appropriate table is the table with the minimum temporal resolution which includes a record having a record start time corresponding to the current start time.

26. A program as claimed in claim 24 in which the processing includes summing the data from the relevant records.

27. A program as claimed in claim 24 in which step (c) comprises;
- a program step for selecting the table with the lowest temporal resolution:
- a program step for determining if the table contains a record start time corresponding to the current start time and the record end time is earlier than or equal to the requested end time;
- a program step for selecting that table if the table does include such a record;
- a program step for determining if there any more tables with higher temporal resolution if the table does not include such a record;
- a program step for selecting the table with the next highest temporal resolution and returning to the first determining step if there are such tables;
- a program step for selecting the table which has the most amount of overlap with the current start time and requested end time if there are no such tables.

28. A program as claimed in claim 24 in which step (d) comprises;
- a program step for selecting the relevant data from the selected record;
- a program step for determining if the selected record time interval lies completely between current start time and request end time, a program step for adding all of the selected data from that record to the summary for that relevant data if it does so;

determining if there are any more types of data required and if so, selecting the next requested type of data from the selected record and return to the first determining step above, and if not returning to the preceding step;

a program step for adding pro-rata the part of the data for that record which overlaps with the current start time and requested end time to the summary for that data, and returning to the second determining step if in the first determining step the selected record time interval does not lie completely between current start time and request end time.

29. A program as claimed in claim 24 in which, if the requested start time and end time do not map exactly to the start time and end time of record time intervals available in the various temporal tables, choosing the temporal resolution and time interval that has the best overlap at that boundary.

* * * * *

UNITED STATES PATENT AND TRADEMARK OFFICE
CERTIFICATE OF CORRECTION

PATENT NO. : 6,718,346 B1
DATED : April 6, 2004
INVENTOR(S) : Ronald Brown et al.

It is certified that error appears in the above-identified patent and that said Letters Patent is hereby corrected as shown below:

<u>Title page,</u>
Item [54], Title, should read as follows:
-- GENERATING SUMMARY DATA FOR A REQUESTED TIME PERIOD HAVING A REQUESTED START TIME AND END TIME FROM A PLURALITY OF DATA RECORDS --

Signed and Sealed this

First Day of June, 2004

JON W. DUDAS
*Acting Director of the United States Patent and Trademark Office*